United States Patent [19]
Rijkaart

[11] Patent Number: 5,853,783
[45] Date of Patent: Dec. 29, 1998

[54] METHOD AND DEVICE FOR RELAXING A SHEET OF DOUGH

[75] Inventor: Cornelis Rijkaart, Kortenhoef, Netherlands

[73] Assignee: Sasib Bakery Holland N.V., Asperen, Netherlands

[21] Appl. No.: 930,523

[22] PCT Filed: Mar. 29, 1996

[86] PCT No.: PCT/NL96/00132

§ 371 Date: Sep. 29, 1997

§ 102(e) Date: Sep. 29, 1997

[87] PCT Pub. No.: WO96/29877

PCT Pub. Date: Oct. 3, 1996

[30] Foreign Application Priority Data

Mar. 29, 1995 [NL] Netherlands ............................ 9500601

[51] Int. Cl.6 .................................. A21C 9/00; A21D 6/00
[52] U.S. Cl. ............................... 426/496; 99/451; 264/70; 366/109; 425/456; 426/238
[58] Field of Search ..................................... 426/238, 496; 99/450.1, 451; 366/109; 425/432, 456; 264/70

[56] References Cited

U.S. PATENT DOCUMENTS 4,957,426  9/1990  Hayashi .................................. 425/456
5,024,145  6/1991  Bailey et al. ............................. 99/451

FOREIGN PATENT DOCUMENTS

| 0329398 | 8/1989 | European Pat. Off. . |
| 0353036 | 1/1990 | European Pat. Off. . |
| 0477774 | 4/1992 | European Pat. Off. . |
| 2569334 | 2/1986 | France . |
| 4011828 | 1/1992 | Japan . |
| 0411821 | 6/1974 | U.S.S.R. . |
| 0663359 | 5/1979 | U.S.S.R. . |
| 1005749 | 3/1983 | U.S.S.R. . |
| 1386137 | 4/1988 | U.S.S.R. . |

*Primary Examiner*—George Yeung
*Attorney, Agent, or Firm*—Ladas & Parry

[57] ABSTRACT

Method and device for relaxing a sheet of dough, comprising a first conveyor belt, a second conveyor belt, a supporting device disposed between the first and second conveyor belts and a vibration generator interacting with the supporting device, in which the first conveyor belt conveys the sheet of dough at a first speed of conveyance on the supporting device, the vibration generator by way of the supporting device exerts a mechanical vibration with an essentially constant frequency on the sheet of dough, and the second conveyor belt discharges the sheet of dough at a second speed of conveyance which is essentially the same as the first speed of conveyance of the supporting device.

21 Claims, 1 Drawing Sheet

METHOD AND DEVICE FOR RELAXING A SHEET OF DOUGH

BACKGROUND OF THE INVENTION

During the processing of a sheet of dough prior to packaging, freezing or baking thereof stresses can be introduced into the dough, and these can disappear from the dough, allowing the dough to relax, after a resting period of, for example, 10 to 20 minutes. The stresses can be introduced during the production of the dough and subsequent kneading and/or calibration as regards the thickness, and during conveyance of the dough along successive means of conveyance with possibly differing speeds of conveyance. If the dough is not subsequently relaxed, in the course of which the stresses in the dough essentially disappear, when a slab of dough is cut out of the sheet of dough fed in, uneven shrinkage will occur in the slab of dough in various directions, thus giving deformation of the slab of dough relative to the cut-out shape. If, for example, a disc-shaped slab of dough with a circular circumference were to be cut out, this would lead to a slab of dough with an oval shape, fitting completely with ample play into the original circular shape of the cut-out slab of dough, with a greater measurement in the last direction of processing. Since different types of dough relax in different ways and to different degrees, while the cut-out dough products are processed in different ways, for example are or are not frozen or baked immediately, it is difficult to anticipate the expected deformation by selecting suitable dough cutters.

In order to overcome the abovementioned disadvantages, it is known to allow the dough to rest for a period of time, for example 10 to 20 minutes, prior to cutting-out or further processing, for example freezing or baking, as a result of which the stresses in the dough can largely disappear. A disadvantage of this practice is that it extends the processing time of the dough considerably, which increases the cost and also increases the danger of contamination of the dough from the environment during the resting period. Furthermore, the dough will have to be stored or buffered during the resting period, which requires additional equipment and occupation of floor space in a processing room. If, prior to cutting-out the dough consists of a continuously fed-in sheet, this requires an endless means of conveyance of considerable length depending on the speed of conveyance, sometimes several tens of meters. Such equipment for resting the dough therefore increases the costs of investment, production and maintenance, and thus the cost of the dough products obtained. Moreover, since the resting equipment generally has to be limited in size, in particular conveyor belts have to be a limited length, the relaxation will generally not be complete, which results in dough in which residual stresses are still present. If, for example, disc-shaped slabs are cut out of that dough, shrinkage can still occur all the way round, and some deformation to an oval shape of the cut-out slab of dough can occur in the last processing direction.

When the resting step for relaxing the dough is used, if the resting time selected is not particularly long, a significant, non-uniform stress can remain in the dough. Since the dough relaxes slightly again and shrinks during baking, the baked product can still acquire an undesirable deformation.

OBJECTS OF THE INVENTION

The object of the invention is to overcome the drawbacks of the known method and device.

To achieve said object the invention provides a method for relaxing a sheet of dough, comprising conveying the sheet of dough at a first speed of conveyance on a supporting means, generating a mechanical vibration with an essentially constant frequency and transmitting it to the supporting means, transmission of the vibration by the supporting means to the sheet of dough, and discharging the sheet of dough at a second speed of conveyance which is essentially the same as the first speed of conveyance of the supporting means.

Further the invention provides a device for imparting a vibration to a sheet of dough, comprising a first means of conveyance, a second means of conveyance, supporting means disposed between the first and second means of conveyance, and a vibration generator interacting with the supporting means, in which the first means of conveyance conveys the sheet of dough at a first speed of conveyance on the supporting means, the vibration generator by way of the supporting means exerts a mechanical vibration with substantial constant frequency in a range between 400 Hz and 4000 Hz on the sheet of dough, and the second means of conveyance discharges the sheet of dough at a second speed of conveyance, which is substantially identical to the first speed of conveyance of the first means of conveyance.

Through use of the method and device according to the invention, the sheet of dough is relaxed in such a way during the vibration that when a slab of dough is cut out of the relaxed dough the cut-out slab of dough now shows virtually no shrinkage and no deformation, and a predetermined desired shape is also retained during baking. Since the supporting means for the dough and a vibration generator for generating the mechanical vibration are relatively small in size compared with older equipment in which the dough had to rest for a relatively long time, a considerable saving in the floor space of a processing room can be obtained. Moreover, a considerably shorter processing time between production of the dough and final processing of cut-out slabs of dough is obtained. This produces a considerable saving in costs of investment, production and maintenance. Since exerting the mechanical vibration takes relatively little time and can even be carried out during the normal conveyance of the dough, the dough is exposed to possible contamination from the environment for a much shorter period. In this respect, a dough product of better quality than previously can therefore also be obtained.

The vibration frequency and vibration amplitude selected can be chosen depending on the type of dough currently being processed, the thickness of the dough and the speed of conveyance. Very good results were achieved during experiments within a frequency range of 400 Hz to 4000 Hz and a vibration amplitude of 2 to 15 mm, in particular between 900 and 1100 Hz and an amplitude of approximately 4 mm.

BRIEF DESCRIPTION OF THE DRAWINGS

The invention will be explained in greater detail below with reference to the appended drawings, in which.

DESCRIPTION OF PREFERRED EMBODIMENTS

Figure 1:
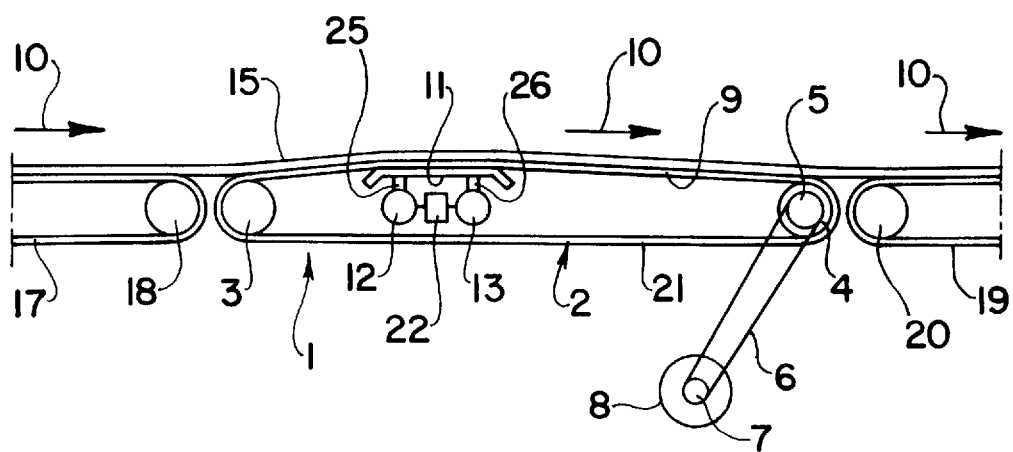
FIG. 1 shows a first embodiment of the device according to the invention.

A device for relaxing stresses in dough is indicated in general by reference number 1 in the drawings. The relaxation device 1 comprises an endless means of conveyance, in the form of a conveyor belt 2 which is guided at the ends around return pulleys 3, 4. A gear wheel 5 is fixed on return pulley 4. The chain wheel 5 is connected by means of a chain 6 to a chain wheel 7 of a drive motor 8. The motor 8 is energized in such a way that the top, bearing part 9 of the conveyor belt 2 is moved in the direction of the arrow 10. The relaxation device 1 also comprises a vibrating table (or vibrating plate) 11. The top side of the vibrating table 11 is preferably situated at some distance above an imaginary line connecting the top sides of the return pulleys 3 and 4. In this way the conveyor belt 2 is supported well on the vibrating table 11. The coefficients of friction of the conveyor belt 2 and of the top side of the vibrating table 11 are such that the conveyor belt 2 can slide easily over the vibrating table 11 during the conveyance. To this end, the top side of the vibrating table 11 can be provided with a covering with low coefficient of friction. The vibrating table 11 is connected at its underside to two self-synchronizing unbalance motors 12, 13. Through use of such a construction of the vibrating table 11 and the two self-synchronizing unbalance motors 12, 13, a virtually truly vertical, uniformly distributed vibration of the vibrating table over the breadth of the bearing belt part 9 is obtained. This vibration, which has an essentially constant frequency, is transmitted to a piece (sheet or slab) of dough which is being conveyed on the bearing part 9 of the conveyor belt 2, or is resting thereon.

The dough on the bearing part 9 of the conveyor belt 2 is in particular a continuously supplied sheet of dough 15, which is supplied in the direction 10 from a conveyor belt 17 upstream of the conveyor belt 2, and which opposite the return pulley 3 is turned around a return pulley 18. The continuous sheet of dough 15 is discharged onto a conveyor belt 19 downstream of the conveyor belt 2, which opposite the return pulley 4 is turned around a return pulley 20. The speeds of conveyance of the conveyor belts 2, 12 and 19 are essentially the same. However, since the dough relaxes during the vibration thereof, it can be advantageous to select the speed of conveyance of the most downstream conveyor belt 19 slightly lower—for example, no more than approximately 2%—than the speed of conveyance of the most upstream conveyor belt 17.

Although the construction of the vibrating table 11 and the unbalance motors 12 and 13 is shown between the bearing part 9 of the conveyor belt 2 and the return part 21 of the conveyor belt 2, the construction can be fitted at the side or below the conveyor belt 2 and, in particular in view of the actual dimensions of the motors 12 and 13, can be connected by way of coupling means to the vibrating table 11.

Of course, types of vibration generators other than with motors such as the motors 12 and 13 are also possible. The vibrating table 11 can be set vibrating by for example, pneumatic, hydraulic or electromagnetic means.

It must be pointed out that, for the sake of clarity, no frame of the device is shown. However, it will be clear to experts that the conveyor belts 2, 17 and 20, the vibration generator 11, 12 and 13 and the motor 8 are fixed in a suitable manner to a frame.

The conveyor belt 2 can be relatively short. In an experimental arrangement, the conveyor belt 2 was approximately 2 meters long, and the vibrating table 11 measured approximately 80 cm in the direction of conveyance. Furthermore, the vibrating table 11 was fitted close to the upstream return pulley 3 of the conveyor belt 2. In addition to the advantages of using the vibrating table 11, a secondary advantage from this is that the part of the conveyor belt 2 downstream of the vibrating table 11 may be used for further processing of the dough if desired.

In the experimental arrangement the motors 12 and 13 generated a virtually vertical vibration with a frequency of approximately 980 Hz and an amplitude of approximately 4 mm. Exceptionally good results were obtained in this way. When in fact slabs of dough were cut out of the continuous sheet of dough 15 which had left the conveyor belt 2, for example on conveyor belt 19, the cutout slabs of dough were found to be virtually free of stresses and subsequently showed virtually no shrinkage and deformation, and for the rest were particularly flexible and consequently had no tendency to tear during further processing.

It is pointed out that glutens (proteins) are found in flour. Flour for biscuits contains, for example, 8.5% gluten, and flour for a particular type of pastry (strudel) contains, for example, 14.5% gluten. The quality of the flour and the stress in the dough obtained from it also depend on the season and on regional and/or climatic conditions, even though efforts are made to maintain an average consistent quality by mixing different types of flour. Moreover, glutens absorb water, with the result that the composition of the dough as regards the water content also depends on the quantity and quality of the glutens. The composition of the dough therefore depends on various factors.

Glutens combine with water to form "chains", which can lead to shrinkage and even to tearing as the result of stretching, i.e. as the result of stresses in the dough. The dough is made stress-free and more flexible through relaxation thereof. Since the occurrence of stresses, and thus the degree of relaxation, depends on the composition of the dough, and thus of the various factors mentioned above which determine the composition of the dough, the device preferably comprises means for setting the essentially constant frequency and the amplitude of the vibrations produced by the vibration generator 11, 12, 13. A suitable frequency setting range is 400 Hz to 4000 Hz. A suitable amplitude setting range is 1 mm to 15 mm. A combination of a frequency between 900 and 1100 Hz and a vibration amplitude of approximately 4 mm was found to give very good results. These setting means are not shown in detail, but are relatively simple to achieve or to add. For obtaining a different vibration frequency, it is simple to alter, for example, the speeds of rotation of the motors 12 and 13. These speeds are simple to adjust continuously with the aid of electronic means. For regulation of the frequency or the speed of rotation of the motors 12, 13, the motors 12, 13 can be connected to a frequency regulator 22. The vibration amplitude can easily be made adjustable, and continuously adjustable if desired, by using suitable transmission means 25, 26 between the vibrating table 11 and the motors 12, 13. For the sake of simplicity, the transmission means 25, 26 in the figure are indicated only diagrammatically as straight coupling pieces. The vibration amplitude can be set simply by using suitable adjustable arm constructions instead of the above.

Although the invention is explained above for relaxing an essentially continuous sheet of dough 15, which is carried on a means of conveyance 2, which means of conveyance 2 itself rests upon a vibration generator 11, 12, 13, individual slabs of dough can also be relaxed using the invention. In this case use can be made of the same construction as that shown in the figure, but in the case of which the continuous sheet of dough 15 is replaced by successive slabs of dough. On the other hand, such a slab of dough can also be placed on a bearing platform or in a tray, and this can be placed, without the interposition of a means of conveyance, such as the conveyor belt 2, on a vibrating table, such as the vibrating table 11, of a vibration generator.

Figure 2:
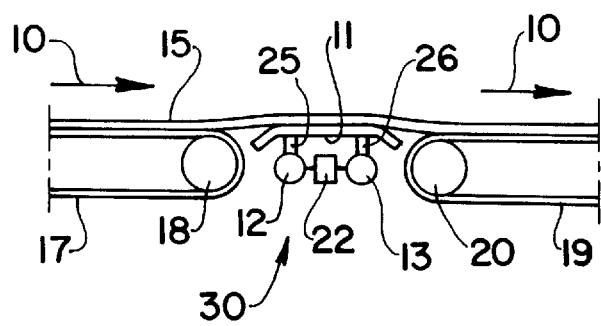
FIG. 2 shows a second embodiment of the device according to the invention.

The alternative device shown in FIG. 2 differs from the device shown in FIG. 1 in that the conveyor belt 2 is omitted, so that a sheet of dough 15 fed in is conveyed directly over the vibrating table 11. In order to reduce the friction between the sheet of dough 15 and the top side of the vibrating table 11, the top side of the vibrating table 11 can be provided with a material with a low coefficient of friction. Various types of such materials which are permitted in the food industry are known.

I claim:

1. Method for relaxing a sheet of dough, comprising conveying the sheet of dough at a first speed of conveyance on a supporting means, generating a mechanical vibration with an essentially constant frequency and transmitting it to the supporting means, transmitting the vibration by way of the supporting means to the sheet of dough, and discharging the sheet of dough at a second speed of conveyance which is essentially the same as the first speed of conveyance of the supporting means.

2. The method according to claim 1, in which the frequency of the vibration is selected between 400 Hz and 4000 Hz.

3. The method according to claim 1, in which the frequency of the vibration is selected between 900 Hz and 1100 Hz.

4. The method according to claim 1, in which the frequency of the vibration is selected depending on characteristics of the dough.

5. The method according to claim 1, in which the dough is an essentially continuous sheet, the supporting means is a means of conveyance, and the frequency of the vibration is selected depending on the speed of conveyance of the means of conveyance.

6. The method according to claim 1, in which the vibration frequency is adjustable.

7. The method according to claim 1, in which the amplitude of the vibration is selected between 1 mm and 15 mm.

8. The method according to claim 1, in which the amplitude of the vibration is selected depending on characteristics of the dough.

9. The method according to claim 1, in which the dough is an essentially continuous sheet of dough, the supporting means is a means of conveyance, and the amplitude of the vibration is selected depending on the speed of conveyance of the means of conveyance.

10. The method according to claim 1, in which the vibration amplitude is adjustable.

11. The method according to claim 1, in which the second speed of conveyance is up to 2% lower than the first speed of conveyance.

12. Device for imparting a vibration to a sheet of dough, comprising a first means of conveyance, a second means of conveyance, a supporting means disposed between the first and second means of conveyance, and a vibration generator interacting with the supporting means, in which the first means of conveyance conveys the sheet of dough at a first speed of conveyance on the supporting means, the vibration generator by way of the supporting means exerts a mechanical vibration with substantial constant frequency in a range between 400 Hz and 4000 Hz on the sheet of dough, and the second means of conveyance discharges the sheet of dough at a second speed of conveyance, which is substantially identical to the first speed of conveyance of the first means of conveyance.

13. The device according to claim 12, in which the frequency of the vibration lies in a range between 900 Hz and 1100 Hz.

14. The device according to claim 12, in which the dough is a continuous sheet of dough, the supporting means is a third means of conveyance, and the frequency of the vibration is selected depending on the speed of conveyance of the third means of conveyance.

15. The device according to claim 12, in which the supporting means is a vibrating table.

16. The device according to claim 12, comprising means for setting the vibration frequency.

17. The device according to claim 12, in which the amplitude of the vibration lies in a range between 1 mm and 15 mm.

18. The device according to claim 12, in which the dough is an essentially continuous sheet of dough, the supporting means is a third means of conveyance, and the amplitude of the vibration is selected depending on the speed of conveyance of the means of conveyance.

19. Device according to claim 12, comprising means for setting the vibration amplitude.

20. Device according to claim 12, in which the vibration generator comprises two self-synchronizing unbalance motors.

21. Device according to claim 12, comprising means for setting the vibration amplitude and in which the second speed of conveyance is up to 2% lower than the first speed of conveyance.

* * * * *